W. M. PIATT.
CORN HARVESTER.
APPLICATION FILED DEC. 31, 1912.
1,067,059.
Patented July 8, 1913.
2 SHEETS—SHEET 1.
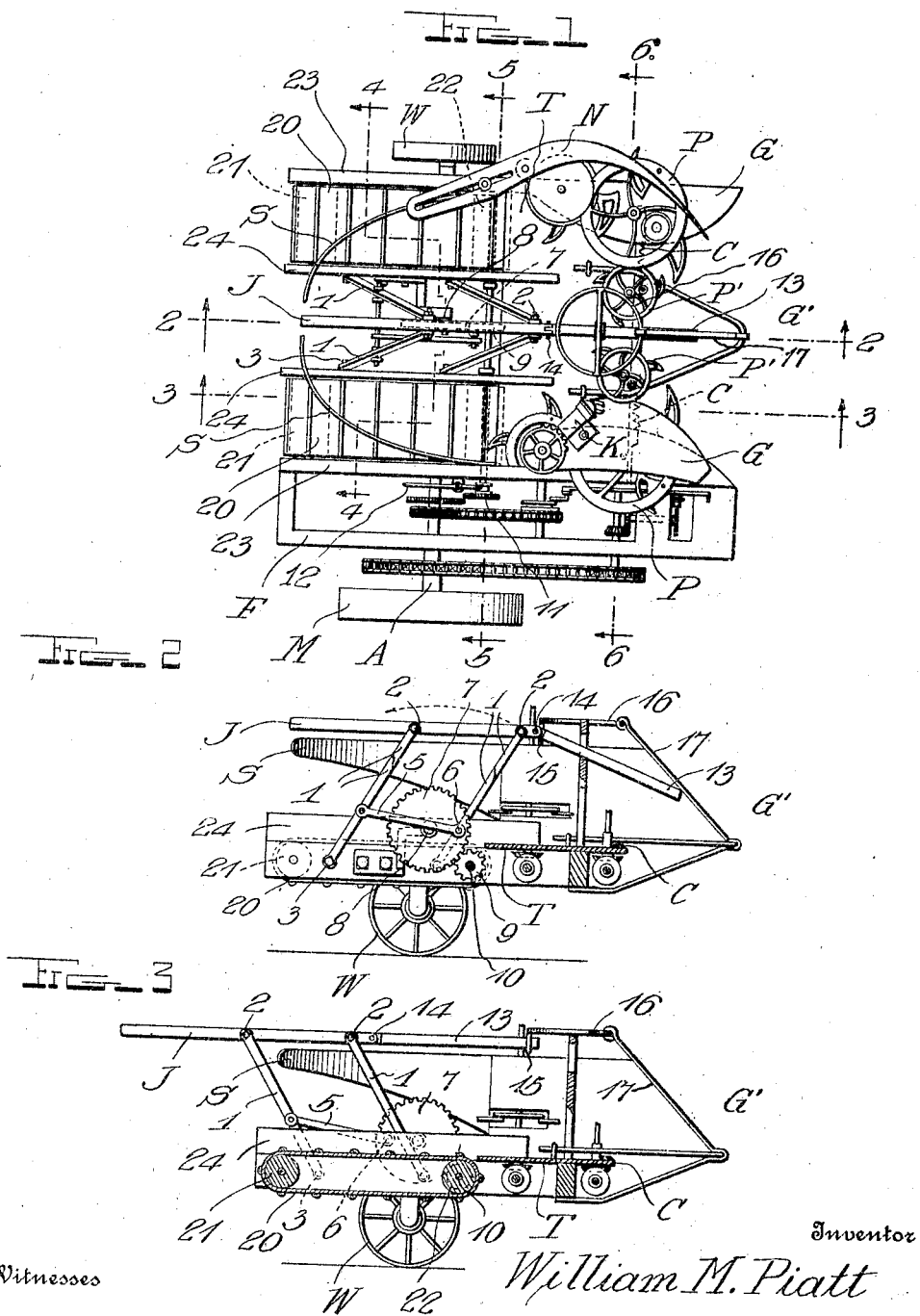
Witnesses
Inventor
William M. Piatt
By
Attorneys

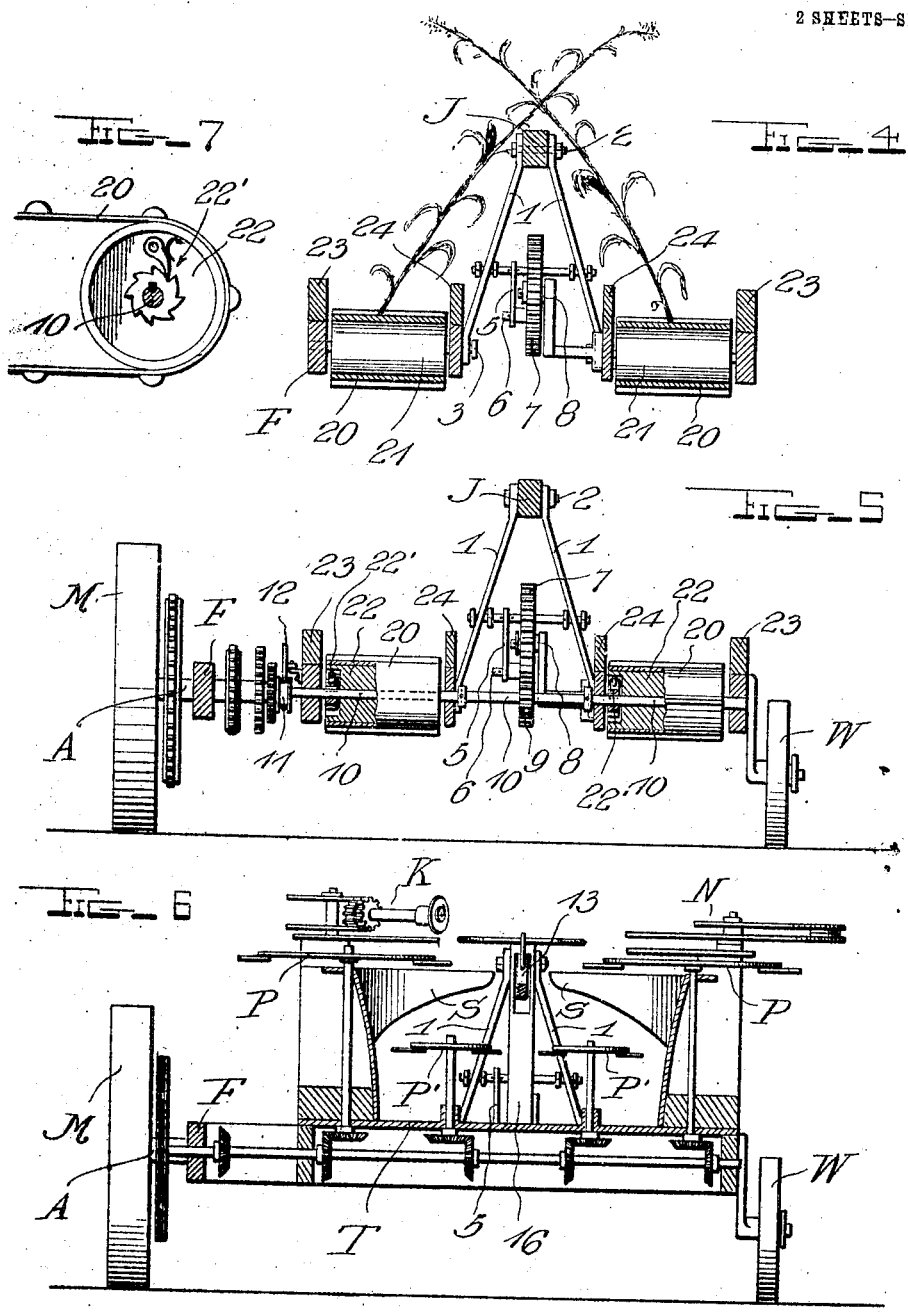

UNITED STATES PATENT OFFICE.

WILLIAM M. PIATT, OF WEST LIBERTY, OHIO.

CORN-HARVESTER.

1,067,059.

Specification of Letters Patent.

Patented July 8, 1913.

Application filed December 31, 1912. Serial No. 739,539.

*To all whom it may concern:*

Be it known that I, WILLIAM M. PIATT, a citizen of the United States, residing at West Liberty, in the county of Logan and State of Ohio, have invented certain new and useful Improvements in Corn-Harvesters; and I do declare the following to be a full, clear, and exact description of the invention, such as will enable others skilled in the art to which it appertains to make and use the same.

This invention relates to harvesters, and more especially to those adapted for cutting and binding corn automatically; and the object of the same is to improve the mechanism for ejecting the bundles or shocks of corn from the rear of the machine so carefully that the shocks will be deposited upon the ground unbroken and left standing as the machine progresses forward. This object is carried out by mounting the jib on swinging legs so that it will be maintained ever in a horizontal position, and moving it from its normally forward position to the rear in conjunction with the contemporaneous movement of a pair of endless aprons—all driven by the power mechanism of the machine and under the control of the operator. The details of this construction will be found in the following specification, and are shown in the accompanying drawings wherein—

Figure 1 is a plan view of the machine complete, and Figs. 2 and 3 are longitudinal sections taken substantially on the lines 2—2 and 3—3 of Fig. 1, the former showing the jib as in its forward or normal position and Fig. 3 showing it moved to the rear. Fig. 4 is a detail in transverse section, taken on the line 4—4 of Fig. 1. Figs. 5 and 6 are cross sections on the lines 5—5 and 6—6, looking in the direction of the arrows. Fig. 7 is an enlarged detail giving an end elevation of one of the forward rollers of the endless carrier.

The present ejecting mechanism is an improvement on similar features illustrated and described in my prior United States Patents Number 474,761 dated May 10, 1892, and 501,101, dated July 11, 1893. By preference I employ much of the same structure shown in those patents, viz: Mounted on the main wheel M and on another wheel W is a framework F having guards G and G' at its front properly spaced to adapt the machine to cut two rows of standing corn. Just in rear of said guards is the cutting apparatus C, and in proper relation thereto are the upper and lower packers P and P', the knotting mechanism K, and the needle N—all driven by suitable connection with the main axle A so that the corn stalks as they are cut pass over the table T alongside the jib J and are packed backward against the spring fingers S, and from time to time the bundle thus formed is tied into a shock in a manner well known and needing no further detailed description. The purpose of the present invention is to improve the means for ejecting this shock from the rear end of the machine by manually controlled mechanism operated from the main axle A, as will now be explained in detail.

The jib J is movably supported on two pairs of upwardly converging legs 1 whose upper ends are pivoted at 2 to the jib near the front end of the latter and at about its mid-length, and whose lower ends are pivoted at 3 to a suitable support in the framework F; and 5 is a rod connecting one of these legs with a wrist pin 6 in a crank wheel 7 which is mounted on a stub shaft 8 suitably supported from the framework. Any suitable means may be provided for rotating this crank wheel from the main axle A, and under the control of the operator, but by preference I provide it with teeth so that it becomes a gear, and engage with it a smaller gear 9 fast on the inner end of a shaft 10 which has any suitable form of clutch mechanism 11 capable of being thrown into or out of connection with the main axle by means of a lever 12. When the operator moves this lever in one direction, the power gear 9 rotates the larger gear, and its wrist pin causes the connecting rod 5 to move the jib from its forward or normal position as best seen in Fig. 2, to the rear to the position best seen in Fig. 3. When in the forward position, a tongue 13 pivoted to the front end of the jib at 14 and passing through a guiding eye 15 carried by a suitable support 16 on the main frame, hangs beneath the front rod or what might be called the "ridge-pole" 17 of the intermediate guide G' and is housed therein as seen in Fig. 2; but when the jib is moved to the rear to the position shown in Fig. 3, this tongue is drawn through the eye 15 and obviously drags under the corn stalks where they lie across the jib as seen in Fig. 4, to which position they were thrown by the upper packers P which are longer and larger than the lower packers P' as usual. On the other hand, when the jib moves forward to resume its normal position, the tongue 13 is pushed through the eye 15 and offers no resistance to the entrance of corn stalks which are cut meanwhile. Coacting with this jib and tongue is a pair of endless aprons 20 moving over proper rollers 21 and 22 whereof the latter is connected by pawl-and-ratchet mechanism 22' with the shaft 10, and these aprons constitute carriers moving between upright guides 23 and 24 on the framework, the latter standing just outside the legs 1 which support the jib, as best seen in Fig. 4. It follows that when the lever 12 is moved to throw the clutch into engagement with the power gear on the axle A, rotation of the shaft 10 causes the movement of the jib as above described, and simultaneously causes the rotation of the power rollers 22 so that the aprons 20 are moved to the rear and the butt ends of the stalks resting thereon (see Fig. 4) are carried to the rear with them. The result is that the shock which has just been tied is bodily transported to and ejected from the rear end of the machine, and it drops onto the ground in an upright position, and the rear end of the jib is drawn out from it. While the shaft 10 is making a sufficient number of revolutions to carry the aprons 20 to the rear, the driven gear 7 is making one complete revolution. The movement of its wrist pin 6 from a forward position as shown in Fig. 2 to a rearward position as shown in Fig. 3 swings the jib to the rear and causes the latter to assist in the ejection of the shock; and the other half-revolution of this gear 7 (after the shock has been dropped) moves the jib back to its original position ready to receive other stalks in the formation of another shock. Meanwhile a few stalks will have been cut by the harvester as it progresses over the ground, but these accumulate alongside the tongue 13 which then stands substantially horizontal as seen in Fig. 3, and as the jib moves to the front to resume its normal position this tongue is pushed through these accumulated stalks without disarranging them. The packers P and P' push incoming stalks against those already in place and others follow, so that eventually all the stalks cut are pushed back over the aprons and against the spring fingers S in a maner well known in this art.

I do not wish to be confined to the precise details of construction, nor to the materials and proportions of parts.

What is claimed as new is:

1. A bundle ejector for binders comprising a pair of endless carriers spaced from each other, guides along the sides of said carriers, two pairs of legs pivotally mounted at their lower ends on the inner guides, a jib pivotally supported between the upper ends of said pairs of legs, a driven gear having a wrist pin, connections between the latter and one of said legs, a power shaft through the forward rollers of said carriers, a gear on this shaft meshing with said driven gear, and means for rotating the shaft at will.

2. A bundle ejector for binders comprising a pair of endless carriers spaced from each other, guides along the sides of said carriers, two pairs of legs pivotally mounted at their lower ends on the guides, a jib pivotally supported between the upper ends of said pairs of legs, a driven gear having a wrist pin, connections between the latter and one of said legs, a power shaft through the forward rollers of said carriers, a gear on this shaft meshing with said driven gear, and a clutch element on said shaft; combined with a harvesting machine, binding mechanism thereon, and a driving shaft therein carrying a clutch element adapted to be engaged with the one above mentioned.

3. In an ejector for corn harvesters, the combination with three guides at the front of the machine, a support rising from the intermediate guide, and an eye carried thereby; of a jib, a plurality of pivoted legs movably supporting the same, a tongue hinged to the front end of the jib and passing through said eye, and means for swinging the jib backward and forward while the tongue slides through said eye and its front end rises and falls within said intermediate guide.

4. In an ejector for corn harvesters, the combination with three guides at the front of the machine, a support rising from the intermediate guide, and an eye carried thereby; of a jib, a plurality of pivoted legs movably supporting the same, a tongue pivotally connected with the jib and slidably mounted through said eye, a pair of endless carriers disposed alongside the lower ends of said legs, and means for swinging the jib forward and backward and meanwhile driving said carriers.

5. In an ejector for corn harvesters, the combination with three guides at the front of the machine, a support rising from the intermediate guide, and an eye carried thereby; of a jib, a plurality of pivoted legs movably supporting the same, a tongue pivotally connected with the front end of the jib and slidably mounted through said eye, a pair of endless aprons disposed alongside the lower ends of said legs, a driven gear having a wrist pin, connections between said pin and one of the legs, a smaller driving gear meshing with the driven gear and disposed between the front rollers of said carriers, and a single shaft on which said smaller gear rollers are mounted, the proportion of said gears being such that while the driven gear is making one complete revolution the driving gear and rollers make sufficient revolutions to carry the upper side of the endless aprons around the rear rollers thereof.

6. A bundle ejector for binders comprising a pair of endless carriers spaced from each other, guides between said carriers, two pairs of legs pivotally mounted at their lower ends on the guides, a jib pivotally supported at the upper ends of said pairs of legs, a wheel having a wrist pin, a link connecting the latter and one of said legs, and means for rotating said wheel at will.

In testimony whereof I have hereunto set my hand in presence of two subscribing witnesses.

WILLIAM M. PIATT.

Witnesses:
  JOHN A. WALTERS,
  J. THATCHER.